Figure 1:
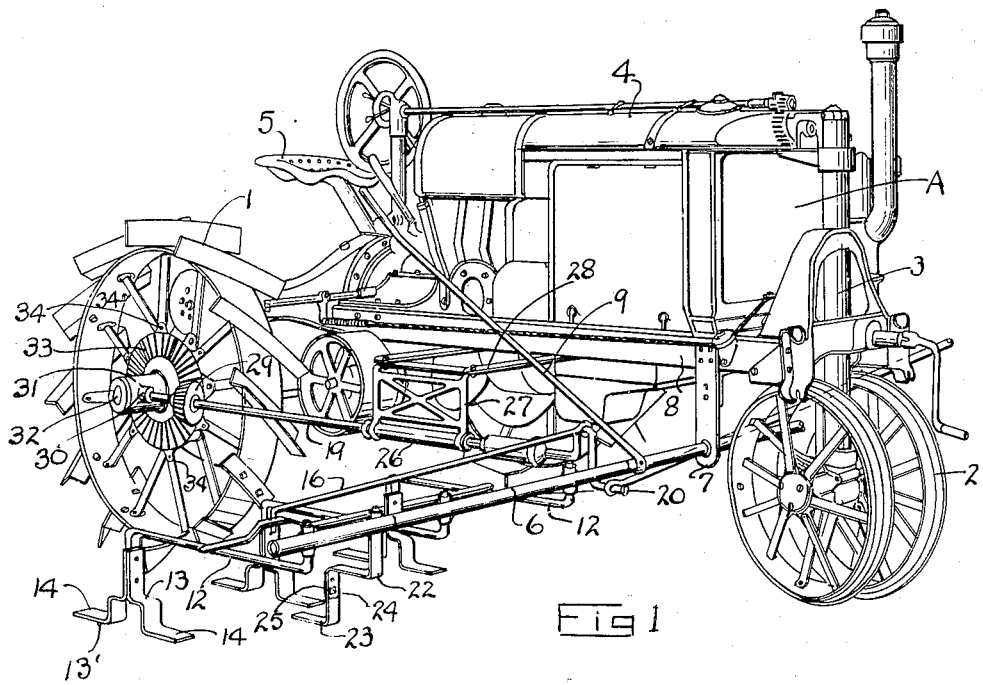

Jan. 31, 1933.  C. J. JOHNSON  1,895,665
COTTON CHOPPER
Filed March 12, 1931

Chas J Johnson Inventor

By Jesse R. Stone & Lister B. Clark
Attorneys

Patented Jan. 31, 1933

1,895,665

UNITED STATES PATENT OFFICE

CHARLES J. JOHNSON, OF CORPUS CHRISTI, TEXAS, ASSIGNOR OF ONE-HALF TO GEORGE EMMERT, OF CORPUS CHRISTI, TEXAS

COTTON CHOPPER

Application filed March 12, 1931. Serial No. 521,947.

My invention relates to cotton choppers for use in chopping or thinning out young cotton plants after they have started to grow.

It is an object of the invention to provide a cotton chopper having hoes or blades thereon adapted to reciprocate across the rows of cotton at a uniform rate so as to thin out the plants in the row to the desired spacing and at the same time to cut out the weeds standing in the row in the usual manner.

It is desired to provide a device which may be driven by power when desired and which may serve to operate a plurality of hoes so as to chop a number of rows of cotton simultaneously.

I desire to so mount the hoes that they may be reciprocated simultaneously from opposite sides of the power mechanism toward and away from each other so as to provide a balanced thrust upon the frame due to the reciprocation of the hoes.

My device is adapted for being driven by a tractor or to be hauled by a team of horses or mules and in the drawing herewith I have illustrated the same as attached to a tractor.

In Fig. 1 I have shown a perspective view illustrating the device as secured to the frame of a tractor and adapted to be driven by power therefrom.

Figure 2:
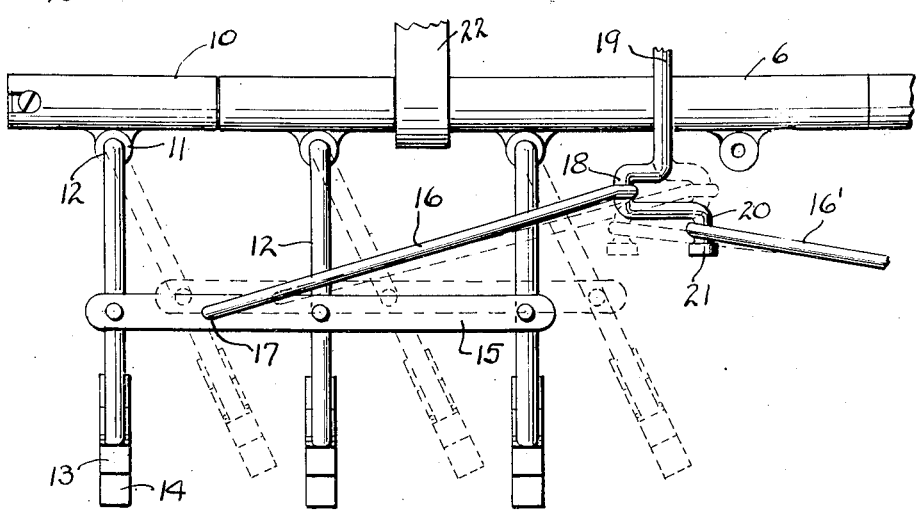

Fig. 2 is a broken plan view illustrating the manner of supporting and operating the hoes.

In the drawing, as shown particularly in Fig. 1, the tractor A is intended to illustrate any type of tractor adapted for farm work. It has a pair of rear wheels 1, ordinarily termed the bull wheels or drive wheels, and a pair of small wheels forwardly of the tractor at 2, spaced fairly close together and adapted to be moved by rotation of the steering post 3 by means of the steering rod 4, manipulated from the driver's seat 5.

I have shown the cotton chopping mechanism as being supported from a tubular frame member 6, which is adapted to be supported in downwardly extending plates 7, attached to the frame 8 of the tractor. It is to be understood that this tubular support extends through under the forward side of the vehicle and projects at both sides of the frame. A portion of this shaft is shown as broken away for purposes of clearness. Said frame member 6 may be further supported by brace rods 9, extending in a diagonal position for engagement with the frame of the tractor.

The manner of attachment of the hoes to the frame member 6 is shown best in Fig. 2. A plurality of sleeves 10 are mounted upon the frame member, each of said sleeves having a lug 11 on the rearward side thereof through which is formed a vertical opening to receive the end of the arm 12 of a hoe. As shown in Fig. 1, this arm may project upwardly to engage within the bearing openings 11, or, as seen in Fig. 2, the arms 12 may be extended downwardly to engage therethrough, depending upon the position of the supporting frame member 6. Ordinarily it is desirable to place the frame member upwardly away from the cotton and when this is done the arms will extend into the bearings from below as shown in Fig. 1.

It will be seen that the arms are bent to form an elbow adjacent the bearings and extend rearwardly for attachment at their extremities with the hoe members 13. I contemplate that only one hoe or contact member may be secured to each of the arms, but in Fig. 1 I have illustrated two members attached to each arm, one of them being curved forwardly from the end of the arm and the other member 13' being extended rearwardly so that there are two horizontal hoes 14 engaging the ground for cutting action upon the cotton.

The arms are adapted for simultaneous operation by means of a connecting bar or cross head 15. I have shown three arms 12 at each end of the frame 6. It is to be understood, however, that two or more of these arms may be operated at each side of the tractor in an obvious manner. They are caused to reciprocate from the full line to the dotted line position, as shown in Fig. 2, by means of a connecting rod 16, one end of which is bent downwardly and engaged within an opening 17 in the cross bar 15. The other end is engaged about the crank arm 18 formed on the crank shaft 19. As will be seen particularly from Fig. 2, there are two crank arms 18 and 20 formed upon the shaft. The forward extremity 20 has a knob 21 at the forward end to provide means to prevent the removal from the arm of the second connecting rod 16′, which serves to operate a similar set of three hoes on the opposite end of the frame member 6.

It will be seen that the two sets of three arms 12, upon which the hoes are mounted, will be moved in opposite directions by the rotation of the crank shaft 19. That is, the said arms will be moved outwardly simultaneously and will be then drawn toward each other on the next stroke so that such thrust as may be experienced, due to the rotation of the shaft, will be in opposite directions at each end of the frame and thus serve to balance the shock which might result in the reciprocation of the hoes.

Mounted upon the frame member 6, at each side of the center thereof, I provide a guide or support member 22. This member is shown as being connected to a sleeve 10 and curved backwardly and downwardly and provided with a shoe 23 thereon which slides on the ground in the progress of the machine. This shoe tends to form a sliding support for the sleeve 10 and the frame and to regulate the height thereof from the ground so that the cutting of the hoes may be more accurately adjusted. The guide shoe 23 is adjustable vertically relative to the support 22 through a joint shown at 24 in the said support toward the lower end thereof. It is contemplated that the bolts 25 extending through openings in the two parts of the supporting member may be adjusted in the openings at the joint so as to regulate the length thereof in an obvious manner.

The crank shaft 19 is journaled in a bearing member 26, supported by a yoke 27 from supporting arms 28 secured in the frame of the tractor. The rearward end of the crank shaft is extended through a beveled pinion 29 and is supported within a bearing 30 formed upon a sleeve 31 mounted on the shaft 32 projecting outwardly from a beveled gear 33.

The beveled gear 33 is formed with laterally extending lugs 34 which are bolted to the wheel 1 of the tractor. It engages with the pinion 29 so as to communicate a rotating motion thereto in the operation of the tractor. The shaft 32 is formed upon the beveled gear and projects outwardly therefrom so as to support the bearing 30 for the crank shaft. It is to be understood that the shaft 32 rotates within the sleeve 31, which is held against rotation by the engagement of the bearing support 30 with the crank shaft.

In the operation of my device it will be obvious that the structure of the cotton chopper may be mounted upon any ordinary type of vehicle and driven from the bull wheels thereof, whether said vehicle is power driven or not. The progress of the vehicle along the field will communicate a rotating movement to the shaft 19 and thus reciprocate the opposite sets of hoes in the manner best seen in Fig. 2.

The speed with which the hoes or contact members are reciprocated will be regulated so that the members will engage with the rows of cotton plants at the correct intervals so that the hoes will engage the rows so as to leave the cotton plants spaced properly from each other.

The hoes may be spaced upon the supporting frame member 6, in such manner that they will be the same distance apart as are the rows of cotton in the field. It will be possible to adjust the spacing of the hoes through the arrangement of the sleeves 10 upon the supporting arm.

It will be seen that my cotton chopper constructed in the manner shown and described will be enabled to cut the cotton satisfactorily and efficiently even though the rows are not exactly straight. Each hoe has a side stroke so that as it moves in a horizontal plane it will engage the cotton even though it is slightly out of line as is ordinarily the case.

The device is exceedingly simple in its construction and may be easily operated without getting out of order. The further advantages will be obvious to those skilled in the art.

What I claim as new is:

1. In a cotton chopper a vehicle, a supporting frame thereon, arms pivoted on vertical axes thereon and extended rearwardly and adapted to swing on said frame, hoes on said arms arranged to be reciprocated parallel with the ground, a shaft rotatable from the operation of said vehicle, a crank arm on said shaft, and operative connections between said crank arm and said pivoted arms below their pivots to swing said pivoted arms and move said hoes in a horizontal plane.

2. In a cotton chopper, a supporting frame thereon, arms pivoted to swing horizontally from said frame, contact members on said arms, a shaft rotatable from the operation of said vehicle, a crank arm on said shaft, and operative connections between said crank arm and said pivoted arms whereby said members will be moved in a horizontal plane, and a guide shoe on said frame adapted to bear upon the ground to control the elevation of said members.

3. In a cotton chopper, a frame, means to move said frame, arms pivoted for horizontal movement with respect to said frame and extending rearwardly and downwardly therefrom, contact members on said arms, means on said frame adapted to bear on the ground and movable in accordance with the contour of the ground to regulate the height of said frame, and means operated from said frame to swing said arms.

4. In a cotton chopper, a frame, means to move said frame, arms pivoted at one of their ends on said frame to swing in a horizontal plane, contact members at the free ends of said arms, means on said frame adapted to bear on the ground and adjustable in accordance with the ground elevation to regulate the height of said frame, a crank shaft, means to rotate said shaft, and means on said shaft connected to said arms to swing the same.

5. In a cotton chopper, a tractor having drive wheels thereon, a frame carried by said tractor, arms mounted to swing on vertical axes on said frame, a bevel gear on one of said wheels, a stub shaft thereon, a sleeve on said shaft, a crank shaft supported in said sleeve, a bevel gear on said crank shaft engaging said first named gear, and operative connections between said crank shaft and said arms.

6. In a cotton chopper, a vehicle, a frame thereon, vertical bearings thereon, arms supported on said frame in said bearings and extended rearwardly below said bearings and adapted to swing in a horizontal plane, hoes on said arms arranged parallel with the ground and adapted to reciprocate in a horizontal plane, and means operated by the progress of said vehicle to swing said arms.

7. In a cotton chopper, a vehicle, a frame thereon, arms supported on said frame to swing in a horizontal plane, hoes secured at the rearward ends of said arms, means connecting a plurality of said arms together, a crank shaft rotatable by said vehicle, and a rod connecting said shaft and said connecting means to swing said arms with said hoes thereon.

8. In a cotton chopper, a vehicle, a frame thereon, arms pivotally supported on said frame to swing in a horizontal direction, contact members on the rearward ends of said arms, means connected to said arms to contact with the ground to control the cutting depth of said members relative to the ground, and means to reciprocate said members.

In testimony whereof I hereunto affix my signature this 7th day of March, A. D. 1931.

CHARLES J. JOHNSON.